June 2, 1964
A. R. HOUSER
3,135,047
METHOD OF WELDING
Filed Nov. 6, 1959
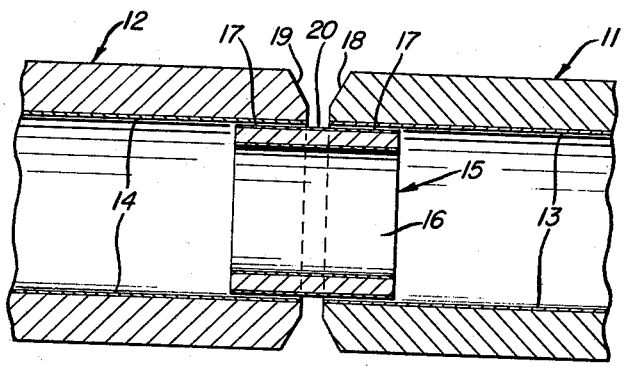
Fig. I
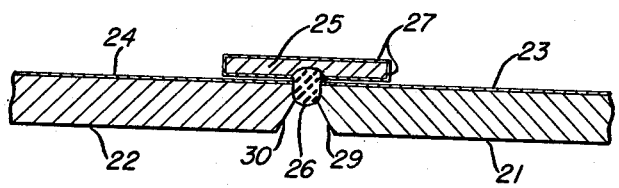
Fig. II
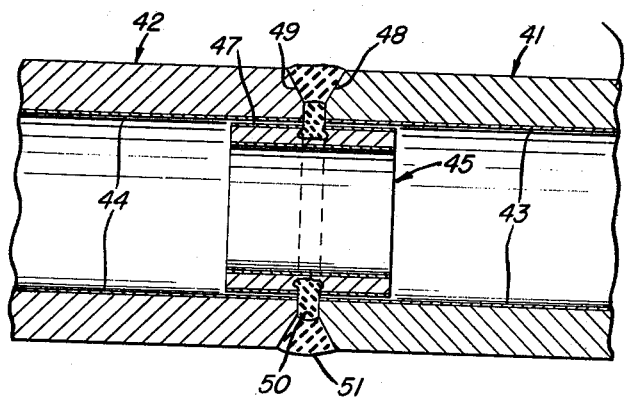
Fig. III
INVENTOR.
Arthur R. Houser
BY
ATTORNEY

3,135,047
METHOD OF WELDING
Arthur R. Houser, Wood River, Ill., assignor to Standard Oil Company, Chicago, Ill., a corporation of Indiana
Filed Nov. 6, 1959, Ser. No. 851,340
1 Claim. (Cl. 29—491)

This invention pertains to a method of welding members having inaccessible aluminum-containing corrosion resistant surfaces and to articles of manufacture thereby produced. More particularly, this invention relates to welding such surfaces to form a substantially enclosed inaccessible chamber having a substantially continuous inaccessible corrosion resistant aluminum-containing surface.

In manufacturing or building reactors, pipes, valves, and other enclosed fluid handling process equipment which is designed to handle corrosive fluids, it is often necessary to employ welding operations to join component parts together to form such process equipment. Where the process equipment is designed to handling corrosive materials such as fluids precautions must be taken to keep the fluids from contacting a corrosive weld holding the equipment together. Generally, such process equipment is made up of steel members or steel component parts, such as, for example, those made from alloy steel and other ferrous metals, and the weld holding the component parts together is a ferrous metal weld. The individual component parts of the particular process equipment to be assembled by welding can be coated on one surface corresponding to the inner surface of the finished piece of process equipment to protect the surface from corrosive action of corrosive materials. However, when the inner surface of the finished article of manufacture is an inaccessible surface it has been impossible to coat the weld with an aluminum coating after the article is assembled because of the inaccessibility of the inner surface. One solution to this problem has been to tack weld a backing member on the inner surface or aluminum coated surface of one component member whereby about ½ the width of the backing member extends beyond the end of the component member, coat the backing member and inner surface of the component member welded thereto with aluminum, position another component member which has been aluminum coated on the backing member in welding relation with the first component member and weld the two component members together by a welding operation during which the backing member is welded to the edges of both component members by the root pass of the welding step and the two component members are welded together. However, this procedure requires a tack weld to hold the back-up member to one of the component members and further requires that the assembly of the backing member and one component member be coated with aluminum part way through the operation. Further, this procedure relies upon the fusion of two layers of aluminum between a backing member of the component members to be joined to form a continuous corrosion resistant interior surface. The prior art process also specifies that diffused aluminum-coated aluminum backing members are not to be used. Prior art processes also often specify tack welding backing members on the upstream side prior to aluminizing.

I have now invented a process which employs a diffused aluminum-steel backing member, which eliminates the tack welding of the backing member and which eliminates coating the joined backing member and component member with aluminum during the welding operation. In my process the component parts and backing member may be aluminum coated away from the assembly site thereby allowing installation in places where it is impossible to use conventional aluminum coating equipment and processes, such as areas having limited working room as are often found in refineries.

In accordance with my process, ferrous members having inaccessible aluminum-coated corrosion resistant surfaces are joined together using a steel backing member having a diffused aluminum coating. The ferrous members constitute component parts of an assembly which after the welding operation includes an inaccessible chamber having an inner corrosion resistant aluminum-coated surface. The ferrous members and backing member are placed in welding position whereby the aluminum surface of the backing member is in position to back the root pass of a welding operation which is conducted from the exterior or accessible surface of the ferrous members. To form the corrosion resistant chamber or assembly in accordance herewith, the backing member must be completely aluminum coated over the entirety of its surface. Further, it is essential that the root pass weld backing portion of the backing member into which portion the root pass of the welding operation bites be aluminum coated prior to the root pass welding step in all embodiments of this invention. The aluminum coated surface may be diffused either prior to, during, or after the root pass welding step as is more particularly defined hereinbelow. The root pass of the welding operation bites into the aluminum coating and backing member and produces a weld containing generally at least about 3% by weight of aluminum and more desirably from about 7 to about 10 weight percent aluminum. The weld itself is corrosion resistant and there is no necessity for sealing it from contact with corrosive fluids. The welding operation is continued with more welding passes as are necessary to assure a strong welded joint between the joined ferrous members. The process produces, as an article of manufacture, a relatively inaccessible substantially enclosed chamber having a substantially continuous inner aluminum surface which inner surface is corrosion resistant. The chamber is defined by aluminum-coated inaccessible surfaces of the ferrous enclosing members, the aluminum-containing corrosion resistant root pass weld; and the diffused aluminum-coated ferrous backing member. The amount of aluminum in the root pass weld may be conveniently controlled by the amount of aluminum in the aluminum coating backing member deposited during a given coating process, i.e. dipping in molten aluminum, cladding with aluminum or spraying with aluminum. To provide sufficient aluminum in the root pass weld, as set out above, to provide adequate corrosion resistance, the diffused bond of aluminum and ferrous metal should be at least about .003 inch thick and can be up to about .125 inch thick, as more fully described below.

By relatively inaccessible enclosed chamber is meant a chamber which is formed by welding component parts together, which parts serve as enclosing members creating an inner passageway or container capable of retaining or conducting fluids. The chamber may be a conduit such as that formed by welding two elongated pieces of pipe together, a valve formed by welding its component parts together, a reactor shell formed by welding steel plates together, or the like. By inaccessible surface is meant a surface which because of its configuration, position, etc., is not accessible for direct coating with aluminum.

FIGURE I illustrates a cross section of two elongated pipes and a backing member positioned for welding in accordance with this invention.

FIGURE II illustrates a cross section of two plates and a backing member welded together by the root pass of the welding operation in accordance with this invention.

FIGURE III illustrates a partial cross section of an assembled reactor after completion of the welding operation in accordance with this invention.

In accordance with FIGURE I, pipe 11 having aluminum coated inner surface 13 and pipe 12 having aluminum-coated inner surface 14 are positioned in welding relation with each other at their respective ends 18 and 19. Backing ring 15 is positioned at the juncture of pipes 11 and 12 to back the welding operation at the juncture. Backing ring 15 includes an outer diffused aluminum surface 17, diffused aluminum coated root weld backing portion 20 and an inner aluminum-coated surface 16 which may also conveniently be diffused.

In accordance with my method, pipes 11 and 12 are welded together and to backing ring 15 at their ends 18 and 19 by the root pass of a welding operation. Ends 18 and 19 may be conveniently beveled, for example at about a 30° angle, as shown in FIGURE I. The welding operation bites into diffused root weld backing portion 20 of surface 17 and the steel of ring 15 so that the resulting root pass weld (not shown) obtains an aluminum content.

With reference to FIGURE II, plates 21 and 22 are component parts of a fluid storage container having inaccessible aluminum coated corrosion resistant surfaces 23 and 24 respectively, and have been welded together at their ends 29 and 30 and to a backing plate 25 having a diffused aluminum continuous coating 27. The root pass weld 26 resulting from the root pass of the welding operation secures the plates and backing member together and an aluminum content for the weld is derived from the diffused aluminum coating of backing member 25 during the root pass welding operation, as described above.

As the next step in accordance with my invention, end 29 of plate 21 and end 30 of plate 22 are further welded together by additional welding passes to give increased strength to the resulting joint (not shown).

With reference to FIGURE III two halves 41 and 42 of a reactor, each having aluminum coated inner surfaces 43 and 44 respectively, have been welded together in accordance with my invention to provide a finished article of manufacture. The resulting structure is a relatively inaccessible chamber having a continuous aluminum-coating corrosion resistant inner surface. The inner surface includes the aluminum coated surface 43 of reactor half 41, the aluminum-containing root pass weld portion 50 and weld 51 which root pass portion has a corrosion resistant aluminum content, the continuous diffused aluminum coated surface 47 of backing member 45, and the aluminum coated inner surface 44 of reactor half 42. It is evident that the reactor illustrated by FIGURE III was produced by positioning reactor halves 41 and 42 in welding position with backing member 45 positioned to back the welding operation. The reactor halves were then welded at their respective ends, 48 and 49 by root pass welding operation which bit into backing member 45 and welded backing member 45 and ends 48 and 49 together while providing root pass 50 with an aluminum content sufficient for corrosion resistance. Subsequent welding passes completed weld 51 between ends 48 and 49 to provide a strong joint.

The backing member should be of a configuration corresponding to the configuration of the component part members at the edges which are to be welded. For example, where the component parts are elongated pipe sections having equal diameters the backing member is a simple ring of a diameter smaller than the inner diameter of the pipe sections so that it may be fitted within pipe sections. Other configurations such as grooved, flat, angular, etc. are used to conform to the backing of welding operations when constructing correspondingly configurated chambers as is evident from the herein disclosed.

The backing member is positioned so as to back the welding operation. Backing members may be held in place with cement such as a wax or other adherent substance, by a small spot weld or series of small spot welds, by magnetic attraction between the backing member and weldable component part members such as may be created by applying a magnetic force from the accessible side of the component part members, by propping supports or the like. If a spot weld or spot welds are used, such weld or welds preferably constitute part of the root pass weld. The propping supports may be any such supports on the inside of the chamber which hold or prop backing member near or against the inside surfaces of the component part members in position for backing the welding operation. Such propping supports are advantageously removable and for ease of removal may conveniently be composed of a dissolvable substance such as magnesia block, baked sand, diatomaceous silica, or the like, so that after the welding operation the propping supports may be dissolved or broken-up and flushed from the relatively inaccessible chamber which has been formed. Preferably, the position of the backing member is maintained by the force of gravity i.e. it is simply set in place and held in weld backing position by its own weight. Such holding by gravity is easily obtained when using backing rings in pipes which backing rings can be balanced on their outside diameter sides while the pipe is welded in a horizontal position. When welding plates together, the welding operation is preferably conducted from the bottom so that the backing member rests by force of gravity on the inaccessible surfaces of the plates. Further, the backing member may also be held in place by force fitting against the component part members. This is particularly advantageous when welding pipes since the backing member can be force fitted part way into one pipe and the other pipe may be fitted over the backing ring and held by force fitting against the pipes. The backing ring may also have projections thereon on its backing surface and may be held by such projections between edges of the component parts to be welded in position for the welding operation. For example, a backing ring having projections on its outer surface is held in position between two weldable pipes positioned using force fitted backing rings at backing rings with projections, elongated pipes may readily be welded in vertical position since the projections or force fitting will hold the ring in place. Steel backing rings having projections are available commercially.

This invention employs steel backing members having a diffused aluminum-coated surface. The diffused coated surface may be prepared by first coating the weld backing surface of the backing member by dipping, spraying, cladding, or the like. The coating of aluminum should be at least .003 inch thick up to about 0.05 inch thick and preferably from about .008 to about .015 inch thick when sprayed and from about .003 to about .125 inch thick when dipped. Although only the weld backing surface need be diffused, it is preferred that the entire backing member be diffused since the entire backing member must at least be aluminum coated for corrosion resistance and coating and diffusing the entire backing member eliminates a subsequent coating operation on the non-weld backing surfaces. In forming the coating by dipping, the backing member is simply dipped into a molten aluminum bath and withdrawn. The steel backing member should be thoroughly cleaned prior to immersion so that an even coating of aluminum over steel will be assured. In preparing the coating, by spraying, the backing member is simply sprayed with a fluid adherent metallic aluminum containing substance. In forming the coating by cladding, the operation must be carefully controlled and therefore cladding is not preferred. In cladding the steel backing member, the backing member and the aluminum to be used for cladding are both thoroughly cleaned and are then placed together and cold rolled at from 600–700° F. Subsequent annealing above 1000° F. results in a bonding of aluminum and steel; however normally, a very brittle $FeAl_3$ compound is formed above about 1000° F. by the annealing operation and the formation of the compound causes cracking and splitting during subsequent working and welding operations. It has been found that Bessemer steel or open hearth steel containing above 0.25% silicon may be clad with aluminum and annealed at higher temperatures after cold rolling without becoming brittle. Therefore when it is desired to use a cladding operation, such steel is strongly recommended.

After the aluminum coating has been formed on the steel backing member the aluminum coating is then diffused into the steel surface; or diffusing may be accomplished during the coating step as more fully described herein below. Diffusing is accomplished by heating the coated steel backing member to a temperature above the melting point of the aluminum, i.e. above the range at a temperature and for a period of time sufficient to effect substantial diffusion of aluminum and steel in a thickness of at least about .003 inch. The steel surface is softened and becomes alloyed with the aluminum coating forming the diffused aluminum surface. For example, the diffusing may be accomplished by heating to a temperature in the range of 1275° to 1300° F. for at least about ½ hour. Of course, it is to be understood that the time depends on the temperature used, the thickness of the components heated, the nature of the steel, etc. and simple experimentation is all that is necessary to obtain temperature and time ranges for a given component or assembly. When the coating of alumium is put on the steel backing member by a dipping operation, the diffusing of the aluminum into the steel surface can be accomplished at the same time by maintaining the bath of molten aluminum preferably at a temperature in the range of from about 1275° F. to about 1325° F. and immersing the backing member in the molten aluminum for a continuous period of time sufficient to soften the steel and diffuse the aluminum in the steel as desired.

After dipping, the backing member is allowed to cool for handling and the excess scum or dross from the dipping operation must then be ground off; however, I have found that only very little grinding is necessary to make the backing members useful in obtaining good welds. When a cladding operation is used to coat the steel backing member it is advantageous to diffuse the surface immediately after annealing by heating the backing member from the annealing temperature of about 1000° F. up to a diffusing temperature preferably in the range of from about 1275° F. to about 1325° F. Regardless of how the coating was applied to the steel backing member, diffusion of the aluminum into the steel can be accomplished by heating the backing member as set out hereinabove.

The diffusion of aluminum into the steel surface of the backing member may also be accomplished during the welding operation by the heat of the root pass weld. However, diffusion before welding is preferred because if diffusion is carried out at the same time as welding, the operation must be carefully controlled to assume that the surface is heated to a diffusing temperature well above 1000° F. in its entirety, preferably at least within the range of from about 1275° F. to about 1300° F. for about one-half hour, so that the undesirable very brittle FeAl$_3$ will not be formed. Further the diffusion may be carried out after the welding operation by heating the welded assembly to a diffusing temperature preferably in the range of from about 1275° F. to about 1325° F. The preferred preparation of the diffused aluminum surface is by immersing in molten aluminum and diffusing in the same operation as set out hereinabove.

After preparing the diffused aluminum coated backing member it may be advantageous to grind off excess aluminum from the backing member. At least some of the scum and dross, where a dipping operation has been used, must be ground off to insure a good weld. The aluminum coating is diffused into about .003 inch thickness of the steel during the diffusing operation and the grinding should not be so severe as to remove this diffused portion. The grinding may be advantageously used to give a better fit of the backing member, to remove unevenness of the aluminum coating, or to prepare the surface of the aluminum coating by grinding to remove impurities therefrom for an improved welding operation. However, I have found that extensive grinding of the surface is generally unnecessary.

The members which may be joined by the process of this invention to form the articles of manufacture of this invention are those steel members which have inaccessible aluminum-coated steel surfaces and cannot be welded by other means. Such members include reactor segments or component parts, components parts of pumps, valves, storage tanks, elongated pipes and the like. In all instances the interior surface of the article of manufacture, when component parts are positioned together for welding to form the article, is inaccessible for coating the weld after the welding operation. Further, when the component parts are in weldable position with relation to each other the weld cannot be made from the inaccessible surface. It can be readily understood that the above mentioned articles of manufacture given as examples all may provide such inaccessible surfaces.

After assembly of the article of manufacture, even where the backing member has previously been diffused prior to assembly, the entire article of manufacture, if desired, may be diffused by heating to a temperature of from about 1275° F. to about 1325° F. to diffuse the inner coating of the component parts into the steel surfaces of the component parts to provide a continuous diffused aluminum surface over all interior steel parts where this is desired.

Where alloy pipes of low chromium steel are used as weldable members, after welding, the weld should be strees relieved by heating to about 1175–1300° F. for about one hour and then cooling slowly to about 600° F. The aluminum coatings are protected against oxidation during the stress relief operation by coating them with a sealer, such as for example ethyl silicate, which can be flowed over the inaccessible surfaces in the chamber before and flushed out of the chamber after the stress relief operation.

An advantage of this invention is that the prior art tack weld formerly necessary to provide articles of manufacture having inaccessible aluminum coated steel surfaces has been eliminated. As another advantage, invention also eliminates the necessity of coating component parts and backing members at the assembly site. Further, the process of this invention gives a fully diffused coating at the interior of the welded joints of the articles manufactured in accordance herewith. Also, the process gives a full penetration weld which penetrates into and holds into the backing member. Solid aluminum rings do not provide backing for the welding operation since the welding operation will cut right through them. The steel of the backing members used in accordance herewith provides the backing members with adequate backing and a full penetration weld since they do not burn away.

I have formed relatively inaccessible and closed chambers having substantially continuous and relatively inaccessible inner surfaces by welding together steel pipes having inner aluminum-coated surfaces in accordance with this invention. The pipes were 4 to 12 inch O.D. carbon steel pipes and 10 inch O.D. 1¼ Cr ½ Mo alloy steel pipes. The backing was also either carbon or 1½ Cr ½ Mo alloy steel. The backing rings were dipped and diffused in molten aluminum at such a temperature and for such a period of time to give a composite coating of 0.003″ to 0.125″. The maximum diffusion into the parent metal shall not exceed 0.003″ on carbon steel or 0.002″ on alloy steel. Some dross was ground off. The backing rings were then placed in position as described hereinabove and the pipes were welded together using stick electrodes (Croloy 1A or Arcos 1M). Where 1¼ Cr alloy pipes were used, the weld was stressed relieved and the aluminum coating on the inside of the pipes was diffused by heating to a temperature of 1275° F. for two hours using welding machines and heating coils and then cooled slowly to 600° F. The pipes were installed on a desulfurization unit in a refinery and were used to convey hydrogen sulfide containing materials and subjected to the corrosive activity of the hydrogen sulfide. Inspections of two joints were made after 8000 hours and two more joints after 11,000 hours of service with no evidence of deterioration of the aluminum coatings or welds. None of the welds installed have shown signs of corrosion after more than 11,000 hours service.

It is evident from the foregoing that I have provided a new and useful process for welding aluminum coated steel members having inaccessible aluminum-coated surfaces to form new and useful articles of manufacture.

I claim:

In the method of welding tubular ferrous members having beveled ends and aluminum-coated internal surfaces in end-to-end relationship which comprises the steps of arranging said tubular members in substantial end-to-end relationship to form an outwardly-opening V-shaped welding groove therebetween, positioning in internal juxtaposition with said ends of said tubular members a pre-formed ferrous weld backing member to provide a solid backing for the root pass in welding said tubular members, and depositing molten weld material into said welding groove so as to fuse together the tubular members and said backing member, the improvement consisting of providing said ferrous backing member with a diffused aluminum surface coating and depositing said molten weld material in said welding groove so as to effect a weld bite thru said diffused aluminum surface into the ferrous portion of said aluminum-coated backing member whereby the aluminum at the surface of said backing member at the site of said weld bite fuses with said molten weld material to form a weld root containing from about 3 to about 10 weight percent aluminum, thereby providing the resulting joined members with a continuous internal corrosion resistant surface.

References Cited in the file of this patent

UNITED STATES PATENTS

| | | |
|---|---|---|
| 1,990,077 | Kershaw | Feb. 5, 1935 |
| 2,173,109 | Hamblin | Sept. 19, 1939 |
| 2,273,154 | Stromsoe | Feb. 17, 1942 |
| 2,336,297 | Rooke | Dec. 7, 1943 |
| 2,372,712 | Crawford | Apr. 3, 1945 |
| 2,412,271 | Kercher | Dec. 10, 1946 |
| 2,895,747 | Bland et al. | July 21, 1959 |

UNITED STATES PATENT OFFICE
CERTIFICATE OF CORRECTION

Patent No. 3,135,047                                        June 2, 1964

Arthur R. Houser

It is hereby certified that error appears in the above numbered patent requiring correction and that the said Letters Patent should read as corrected below.

Column 5, line 56, for "assume" read -- assure --; column 6, line 35, for "strees" read -- stress --.

Signed and sealed this 22nd day of September 1964.

SEAL)
Attest:

ERNEST W. SWIDER                                        EDWARD J. BRENNER
Attesting Officer                                            Commissioner of Patents